UNITED STATES PATENT OFFICE.

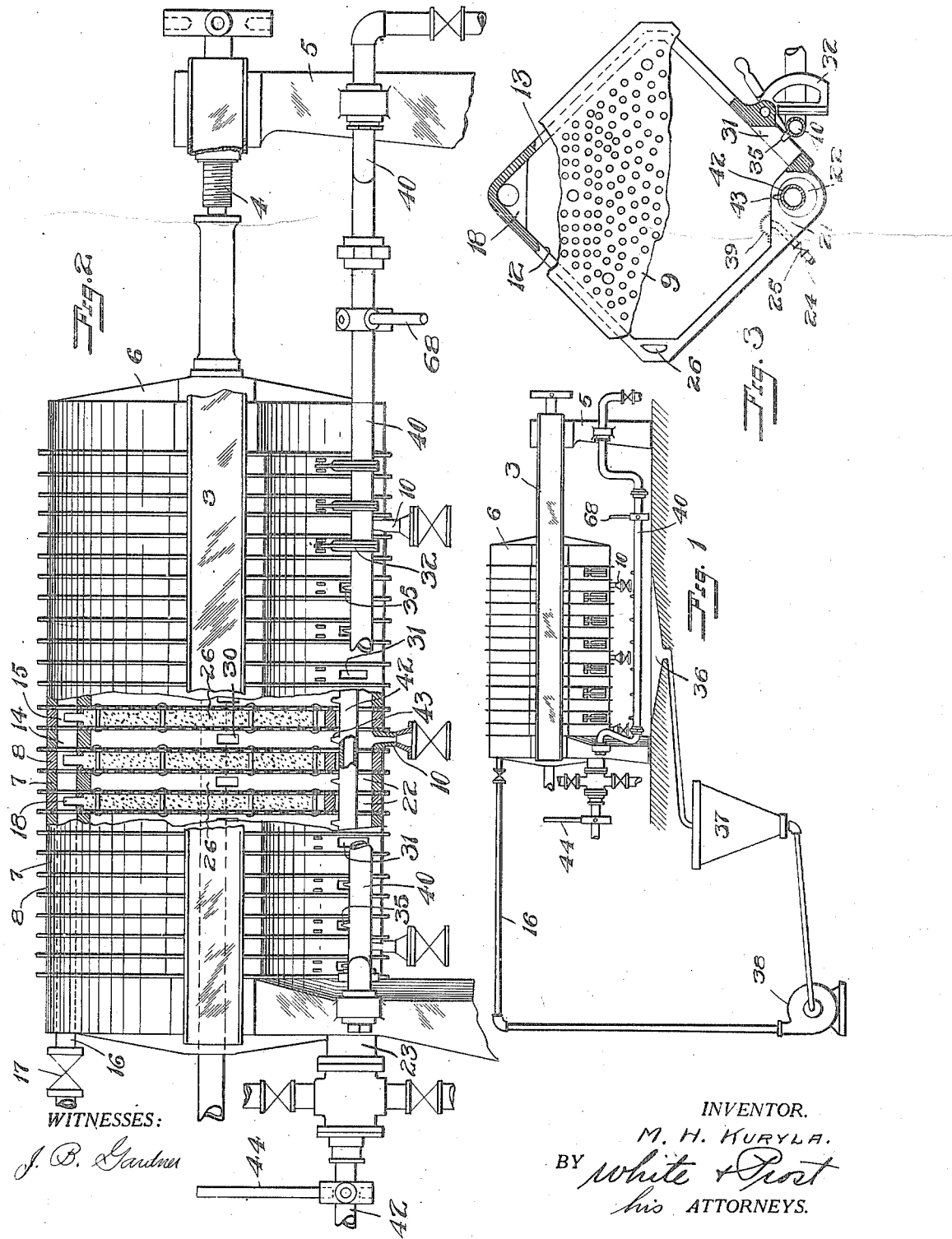

MICHAEL H. KURYLA, OF SAN FRANCISCO, CALIFORNIA, ASSIGNOR TO MERRILL METALLURGICAL COMPANY, OF SAN FRANCISCO, CALIFORNIA, A CORPORATION OF CALIFORNIA.

PROCESS OF TREATING MIXTURES OF LIQUIDS AND SOLIDS.

1,302,814. Specification of Letters Patent. Patented May 6, 1919.

Application filed October 30, 1915. Serial No. 58,791.

*To all whom it may concern:*

Be it known that I, MICHAEL H. KURYLA, a citizen of the United States, and a resident of the city and county of San Francisco, State of California, have invented a new and useful Process of Treating Mixtures of Liquids and Solids, of which the following is a specification.

The invention relates to a process of filtration, and is particularly applicable to metallurgical operations, although it may be advantageously employed in other arts.

An object of the invention is to provide an improved filtering process.

A further object of the invention is to provide a process which accomplishes a practically complete solution of the soluble solid or semi-solid material in a lixiviant.

A further object of the invention is to provide a process by means of which liquid is separated from solid or semi-solid material and the more slowly soluble or larger particles of the solid material are simultaneously dissolved in the lixiviant.

The invention possesses other advantageous features, some of which, with the foregoing, will be set forth at length in the following description, where I shall outline in full one method of carrying out the process of my invention, it being understood that the description relates to a specific form of the generic process of my invention.

In many processes, both metallurgical and manufacturing, serious difficulties are encountered in filtering operations on account of the nature of the material which is to be filtered. Heretofore, the filtering medium has usually consisted of canvas or other fabric and the deleterious effect of the solutions passing through has been so great that the fabric must be renewed very frequently. This renewal entails great expense, which it is one of the objects of this invention to obviate.

As an instance, I shall cite the process of making an aluminate. In this process bauxite and sodium hydroxid solution are mixed, the reaction producing sodium aluminate. This hot mixture is then filtered to separate the sodium aluminate from the red mud, the sodium aluminate passing through the filter cloths and the red mud forming a cake on the filter cloths. The hot sodium aluminate solution produces a very deleterious effect on the filter cloths so that the cloths must often be discarded after a few cakes have been built up thereon.

Furthermore, the larger or more slowly soluble particles of the bauxite do not completely dissolve in the sodium hydroxid solution and in the ordinary process of filtration these particles remain in the red mud and are lost. This feature is also particularly true in the cyanid process of gold and silver recovery, in which the mixture of cyanid solution and ore pulp is filtered to separate the value-bearing cyanid solution from the solid or semi-solid particles in the pulp. In this process, the more slowly soluble value-bearing particles of the pulp are often not dissolved by the cyanid with the result that such values are lost.

My invention not only contemplates the formation of the filtering medium of a material which is not deleteriously effected by the liquid being filtered, but also contemplates the employment as the filtering medium of a selected portion of the solids of the material to be filtered, which portion contains the larger or more slowly soluble particles of the solids. By employing such selected portion of the material to be filtered as the filtering medium, the undissolved soluble particles are subjected to long and repeated contact with the liquid being filtered, which action promotes the dissolution thereof.

In accordance with my invention, I form the filtering medium of the same material as the solid portion of the mixture to be filtered and the portion selected to form the filtering medium preferably contains the larger or more difficultly soluble particles of the solid material. The difficultly soluble particles constitute a minor portion of the filtering medium, the major portion consisting of the larger solid particles of the material which are insoluble in the lixiviant. During the filtering operation the larger and coarser particles are not affected by the lixiviant, but the more slowly soluble particles in the filtering medium are dissolved and the values therein which would ordinarily be lost are recovered. Preferably, the material which forms the filtering medium is separated from the mixture to be filtered by classification or otherwise to separate the slimes or very finely divided material from the larger or granular particles, and such larger or granular particles are used as the filtering medium. If the slimes were not separated from the larger and granular particles and the filtering medium was composed of the solid portion of the mixture without classification or separation, the density and imperviousness of such medium when packed in a frame would be so great that it would be practically impossible to employ it as a filtering medium.

The selected larger or granular particles of the solid portion of the mixture which preferably include the undissolved particles of the more slowly soluble solids are charged into a frame having foraminous sides, so that they become packed therein and the mixture to be filtered is fed against the frame. The liquid passes through the filtering medium and the unfilterable material builds up as a cake on the frame, whence it is subsequently removed.

Filtering a mixture through a mass filtering medium for any great length of time necessarily results in the deposit throughout the filtering mass of some of the fine and slimy particles of the mixture, so that the mass becomes clogged and cannot be further used as a filtering medium until it is cleansed in some way. In some instances the medium may be cleansed by washing it in the filter by a reversed flow of washing fluid or otherwise. Under many circumstances, however, and particularly those encountered in filtering metallurgical and comparable solutions, this method of cleansing a mass filtering medium is insufficient and, in consequence, a mass filtering medium has not heretofore been generally used in such processes.

I have devised a process for cleansing the fouled mass filtering medium, which process is fully described in an application filed contemporaneously herewith. This process in its preferred form consists essentially in removing the fouled mass filtering medium from the filter, preferably without dismembering the filter or separating the parts thereof, and either cleansing it outside of the filter and then returning it, or employing a new charge of the granular or selected portion of the solids of the material being filtered. The fouled mass filtering medium may be removed after each cycle of cake building, or it may be used for several cycles of cake building, depending upon the accumulation of slimes or fine particles therein or upon the time necessary to accomplish the complete solution in the lixiviant of the larger and more slowly soluble particles of the soluble solids contained therein.

In the accompanying drawings, I have shown one type of filter with which the present invention may be performed, but the drawing is used as an illustration only and the invention is not to be considered as being limited in its use to the type of filter shown. I have also shown one means of removing, washing and returning the filtering medium, but other means may be employed when found desirable or expedient, and I do not limit the invention to the particular means shown.

In the accompanying drawings:

Figure 1 is an elevation of one form of filter with which the present process may be practised, showing means for removing, cleansing and reintroducing the mass filtering material.

Fig. 2 is a side view of the filter shown in Fig. 1 the filter being shown partly in section.

Fig. 3 is an end view of one of the filtering medium containing frames, parts thereof being broken away to disclose the construction.

The filter press shown in Fig. 2 comprises a suitable frame, consisting in part of the side rails or channels 3 upon which separate units of the press are mounted. The units are pressed tightly together by means of the screw 4 bearing in the standard 5 and pressing against the end plate 6. The press comprises a plurality of units of different construction alternately arranged, the units 7 constituting the container frames and the units 8 constituting the filter medium or granular material frames. The container frame 7 comprises preferably a rectangular structure entirely open on its interior, for the reception of the material to be filtered. The filtering material frame 8 comprises a similarly shaped structure having screens or foraminous partitions 9 or other filtering material retaining means arranged at the opposite sides thereof. These foraminous partitions are preferably formed of material which is not deleteriously effected by the material being filtered and are held in place on the frames by rivets passing through both plates or partitions and holding them against the frame. The frames 8 are filled with the mass filtering medium which packs therein and the holes in the foraminous plates are of such size that the packed material is retained in the frames forming filter plates.

Means are provided for filling the frames 8 with material which packs in the frame to produce a mass filtering medium, for washing the material in the frame, for removing the material from the frame, for introducing the material to be filtered into the container frames, for discharging filtered liquid and for removing the cake of solid and semisolid material from the container frames, all without separating the various units of the filter. The frames are preferably arranged so that when filtering material is introduced into the frame 8, it flows to all portions of the frame and completely packs the space therein. For this reason the frame is arranged so that an angle or apex of the frame lies above the level of the rest of the frame, or in other words, the sides of the frame are inclined to the horizontal. The material is introduced at the upper apex or angle of the frame, and on account of the slope of the upper side walls 12—13 of the frame, the material may flow to all parts of the frame, thereby obviating any large or material voids. Each frame 7 and 8 is provided with an opening 14—15 respectively extending therethrough, which, when a series of frames are put together in a filter press, makes a continuous channel or passage extending for the length of the press. This passage is preferably closed at one end and is connected at the other end to a conductor or pipe 16 provided with a valve 17. Passing through the wall of the frame 8 is a passage 18, which connects the channel formed by the alined openings 14—15 with the interior of the frame. When it is desirable to fill the frames 8, a mixture of the filtering material and fluid is flowed into the channel from the pipe 16 whence it flows into the frames 8, the material completely filling and packing tightly in the frames. The fluid flows through the foraminous plates 9 into the frames 7, whence it is discharged from the press through the valve controlled outlets 10, or through the conductors 24, or through both. When the frames have become packed with the material, the valve 17 is closed. That portion of the container frame 7 lying below the opening 14, is preferably thicker than that portion of the frame 8 lying below the opening 15, so that the interior of the frame 8 extends to a higher level than the interior of the container frame. This difference in height of the interior of the frames allows the material in the frame to shrink and settle without falling below the level of the liquid in the container frame, and thereby prevents the entry of the material being filtered into the frame 8 above the filtering mass therein and the consequent forming of a cake within the filter frame.

At its lower corner or apex the frame 8 is provided with a thickened portion 21, through which extends an opening 22, through which all of the container frames are interconnected when the filter is assembled. The material to be filtered is introduced into the container frames through the conductor 23 which is alined with the openings 22 in the frames. The filterable material passes through the filtering medium and discharges from the frames, in the present instance, through the conductors 24 arranged adjacent the bottom of the frames 8, which conductors are provided with valves 25. A screen 39 placed over the inlet end of the conductor 24 prevents the filtering material from discharging with the filtrate. Formed in the side corner of each frame is an opening 26, and when a plurality of frames are assembled in a filter press, these openings form a continuous passage extending for the length of the filter. Each container frame 7 is provided with a passage 30 connecting the interior of the frame with the passage formed by the alined openings 26, and after cakes of solid or semi-solid material have been formed in the containers, wash water or solution is introduced into the containers through these passages, for the purpose of removing any valuable liquid remaining in the cake. The liquid for washing the cake may be introduced through any of the other channels which communicate with the container frames.

Means are provided for sluicing the filtering material from the frames 8 when the material becomes clogged or fouled or otherwise affected, to such an extent that renewal or thorough cleaning thereof is advisable. Each frame 8 is provided at its lower end with an aperture 31, which is normally closed by a gate 32. Arranged adjacent the gate, and preferably rotatably mounted, is a pipe 40 provided with nozzles 35 arranged to discharge streams of liquid, fluid or vapor through the apertures 31 and against the packed filter mass. The pipe is also mounted so that it may be swung out of the way of the gates when the gates are to be closed and adjacent the aperatures when the gates are opened, and so that it may be moved during the sluicing operation to direct the streams toward the various parts of the interior of the frame. The portion of the pipe which carries the nozzles is rotatably connected to the remainder of the pipe, which is capable of being swung, so the nozzled portion of the pipe has a motion of rotation and translation and the pipe may be rotated by any suitable means as the handle 68.

The discharged fouled filtering material may be cleansed and conducted back to the frames in many ways, when such operation is desirable, and in Fig. 1, I have shown one form of such means. The filtering material and water or other sluicing fluid discharges from the filter into the pit 36, whence it flows to a hydraulic classifier 37, in which an upwardly directed current carries off the slimes and other fouling matter which has accumulated in the material. The cleansed material settles to the bottom of the classifier, whence it is pumped back into the frames by the pump 38. It is apparent that other means may be employed for separating the accumulated fouling particles from the filtering material, such as classifiers, washers, beaters or screens.

When the material to be filtered contains certain rebellious or slowly soluble elements which are not readily amenable to solution in the lixiviant, or which enter into solution in the lixiviant only after long contact, these rebellious or slowly soluble particles or a portion thereof, together with insoluble particles are separated from the remainder of the material to be filtered and are charged into the filter frames and serve as the filtering medium. During filtration the lixiviant solution passes through the mass in the filter frame and gradually dissolves the values in the slowly soluble particles contained therein. By this method, the values which are readily amenable to solution in the lixiviant are quickly dissolved and removed from the material and the values in the difficultly soluble portion are slowly dissolved and removed, thereby obviating the necessity of agitating or otherwise treating the whole mass of material for a time sufficient to cause the solution of the more slowly soluble portion thereof.

The material which is employed as the filtering medium preferably contains the larger and heavier insoluble particles and the more slowly soluble particles of the mixture to be filtered, and by placing these particles in a frame and employing them as the filtering medium, the valuable contents of the slowly soluble particles are practically completely dissolved by the lixiviant during the one or more cycles of the filtering operation. In the aluminate process, the mass filtering medium charged in the frame will contain particles of bauxite which have not reacted with the sodium hydroxid and during the filtering operation the lixiviant is brought into intimate and prolonged contact with the undissolved particles and the further solution of the bauxite is accomplished.

In the cyanid process, the filtering medium contains the larger, heavier or more slowly soluble particles in the cyanid pulp and the cyanid solution in passing through the medium during the filtering operation will further dissolve the metallic contents of the more slowly soluble particles which did not previously become dissolved in the cyanid solution.

It is seen, therefore, that the present process not only provides a filtering medium which resists the action of the material being filtered, but also provides a process of simultaneously filtering a material and dissolving the valuable contents of the more slowly soluble particles of the material being filtered.

Means are also provided for removing the cakes of solid and semi-solid material from the filter without dismembering it, or separating the various parts thereof. Arranged in the passage formed by the alined apertures 22, is a pipe 42, provided with nozzle 43, there being one or more nozzles in each container frame 7. Sluicing water or other fluid is fed to this pipe and discharges from the nozzles against the cakes, breaking them up and sluicing them from the filter through the valved conduits 10. The pipe 42 is rotatable by the handle 44, so that the discharging jets of liquid may be directed to all parts of the container frame to completely remove the cake.

I claim:

1. The process of treating materials to remove certain components therefrom by a lixiviant, which consists in separating material which is slowly soluble in the lixiviant from the remainder of the material and employing such separated material as a filtering medium for a mixture of more readily soluble material and a lixiviant.

2. The process of treating materials to remove certain components therefrom by a lixiviant which consists in separating from the material a portion thereof containing the larger insoluble particles and particles which are slowly soluble in the lixiviant and employing such portion as a filtering medium for a mixture of the material and a lixiviant.

3. The process of treating materials to remove certain components therefrom by a lixiviant, which consists in separating material which is more slowly dissolved by the lixiviant from the remainder of the material, charging a mixture of said portion and granular insoluble material into a filter and employing the mixture as a filtering medium, and passing a mixture of the material being treated and a lixiviant against said medium, whereby the fluid is separated from the solid portion of the mixture being treated and the more slowly dissolved portions in the filtering medium are dissolved by the lixiviant.

In testimony whereof I have hereunto set my hand at San Francisco, California, this 23rd day of October, 1915.

MICHAEL H. KURYLA.

In presence of—
H. G. PROST.